Figure 1:
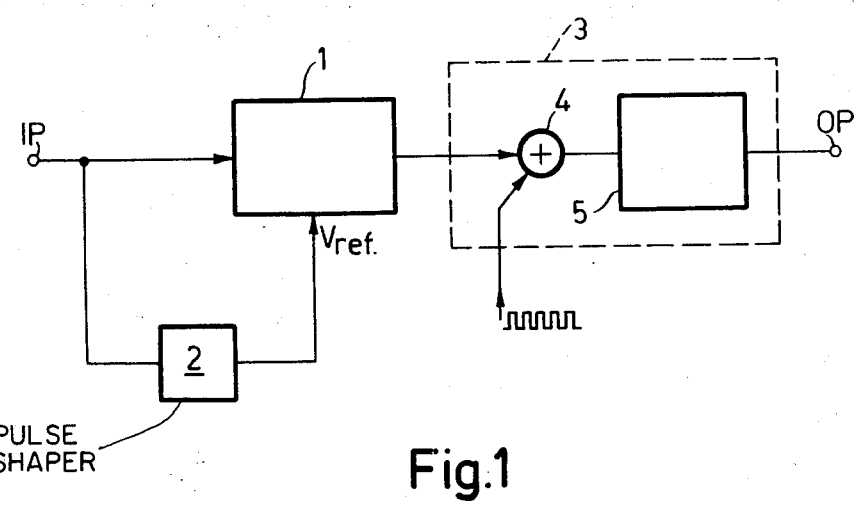

United States Patent [19]
East

[11] 3,764,911
[45] Oct. 9, 1973

[54] DEVICES FOR MEASURING THE DURATION OF AN ELECTRICAL PULSE

[75] Inventor: Peter William East, Felbridge, England

[73] Assignee: U.S. Philips Corporation, New York, N.Y.

[22] Filed: Nov. 15, 1971

[21] Appl. No.: 198,837

[30] Foreign Application Priority Data
Nov. 17, 1970 Great Britain .................. 54,620/70

[52] U.S. Cl. ............................... 324/186, 307/268
[51] Int. Cl. ....... G04f 9/00, G04f 11/06, H03k 6/04
[58] Field of Search ........................... 324/181, 186; 307/263; 328/129

[56] References Cited
UNITED STATES PATENTS

| | | | |
|---|---|---|---|
| 3,571,626 | 3/1971 | Reif | 307/263 |
| 3,594,793 | 7/1971 | Aker | 324/181 |
| 3,670,182 | 6/1972 | Konno et al. | 307/268 |

*Primary Examiner*—Alfred E. Smith
*Attorney*—Frank R. Trifari

[57] ABSTRACT

The specification of the application discloses a pulse width measuring device including a Schmitt trigger driven by the signal pulse and having a reference voltage derived from the signal pulse.

13 Claims, 9 Drawing Figures

Fig. 3b(ii)

3,764,911

DEVICES FOR MEASURING THE DURATION OF AN ELECTRICAL PULSE

This invention relates to devices for measuring the duration of an electrical pulse. Such devices are commonly refered to as pulse width measuring devices.

The technique used for pulse width measurement is to switch on a timing device, such as a clock pulse generator and associated counter, by the leading edge of the pulse concerned and to switch off the timing device by the trailing edge of the pulse. Ideally, the timing device should be switched on the instant the leading edge is initiated and switched off the instant the trailing edge is initiated. In practice, of course, the leading edge has to rise to a given level sufficient to switch on, or trigger, the timing device and, since the leading edge has a finite rise time, the triggering of the timing device is delayed; so leading to a small error. Similarly, the switching off, or inhibiting, of the timing device is delayed until the trailing edge of the pulse has fallen to the inhibiting value. This technique is perfectly satisfactory and gives accurate results if the rise and fall times of the pulse edges are very small in relation to the total duration of the pulse.

As the total pulse duration decreases, however, the rise and fall times become increasingly significant relative to the total duration and the accuracy of measurement decreases if the slopes of the leading and trailing edges are not symmetrical. Also, the accuracy becomes increasingly dependent upon the shape of the pulse signal as the duration decreases. Due to these difficulties inherent in measuring the time pulse width, the definition of pulse width has been standardized as the "half-height" duration; i.e., the duration from the instant the leading edge reaches half its final amplitude level to the instant the trailing edge falls to the half value. The adoption of this standard definition considerably lessens the practical difficulties outlined above since it holds good regardless of the rise and fall times.

Known half-height measuring methods, however, have certain disadvantages. The circuits involved must be accurately linear and no limiting of the pulse height must occur. This implies a limitation of the dynamic range of the signal levels that can be accurately measured by the pulse width measuring device. Further, such known devices require a delay circuit giving a delay time equal to or greater than the longest rise time expected. Since this delay also affects the trailing edge of the pulse, the measurement cannot be completed until the delay period is finished. This reduces the duty cycle of the system and accuracy is not maintained if pulses having a longer rise time than the delay are encountered.

The object of the present invention is the provision of a pulse width measurement system which caters for a wide dynamic range of input pulse levels, which is essentially independent of the signal pulse shape, and which is cheap and simple to produce.

The invention utitizies a conventional Schmitt trigger circuit, i.e., a circuit which is set when the input signal exceeds a reference voltage (Vref) by a given amount (V1) and which is reset when the input signal drops by a given amount (V2) below the reference voltage.

According to the present invention there is provided a device for measuring the duration of an electrical pulse signal comprising time measuring means controlled by the output of a Schmitt trigger circuit having a pulse signal input and a reference voltage input, and further comprising pulse shaping means for deriving a reference voltage from the pulse signal.

Figure 2A:
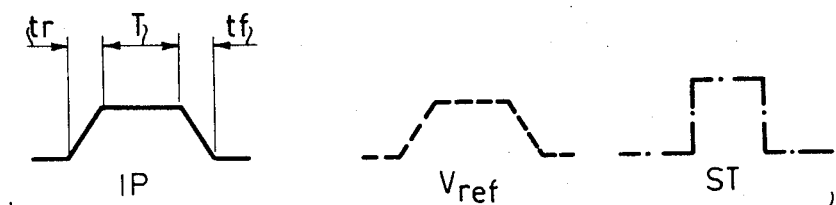
Figure 2B:
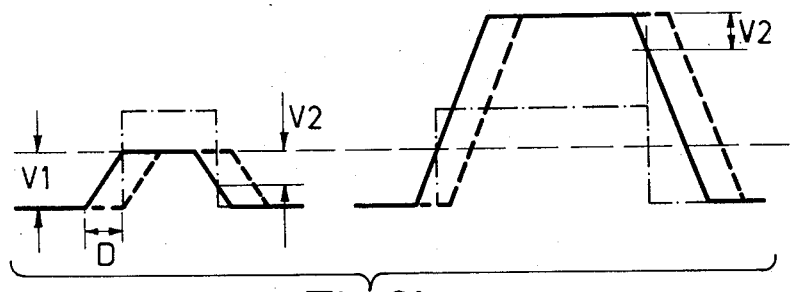

In this way, the reset point of the Schmitt trigger circuit is matched to the input signal level so that the resulting output duration approximates the signal pulse width over a wide dynamic range and is essentially independent of the signal pulse shape. The various features and advantages of the present invention will be apparent from the following description of an exemplary embodiment thereof, taken in conjunction with the accompanying drawings, in which:

FIG. 1 shows a block schematic diagram of a pulse width measuring device according to the invention, FIGS. 2a and 2b show representative explanatory waveforms, and FIGS. 3a–c and 4a and 4b show alternative pulse-shaping devices.

Referring now to FIG. 1, the pulse to be measured is applied at terminal IP as a signal input to a Schmitt trigger circuit 1 and to a pulse shaping means 2. The output of the Schmitt trigger circuit 1 controls a timing device 3 comprising a two-input AND gate 4 and a counter 5. A digital readout of the counter state is given at output terminal OP. The output of pulse shaping means 2 is connected to the reference voltage input Vref of schmitt trigger 1. A clock supply is connected to the second input of AND gate 4.

The operation of the arrangement shown in FIG. 1 will now be explained with reference to the waveforms shown in FIG. 2. As previously explained, the Schmitt trigger circuit changes to the set state when the input signal exceeds the reference voltage Vref by an amount V1 and is reset when the input signal drops an amount V2 below the reference level Vref. As is well known, the trigger circuit can be designed to give any predetermined values to V1 and V2. FIG. 2a shows the line representations used for the input pulse signal IP, the reference voltage Vref, and the Schmitt trigger (ST) output. Also shown on the input signal representation are the rise and fall times, $tr$ and $tf$ respectively, of the pulse signal and the time interval T between $tr$ and $tf$.

FIG. 2b shows the small and large signal cases when the pulse shaping means 2 is a simple delay, such as a coil. The input signal is delayed by an amount D by the delay means 2 to form the reference voltage Vref.

The schmitt trigger 1 changes state directly the input signal reaches V1 since, due to the delay D, Vref is still at zero at this point and is unaffected by signal rise time.

The point at which the Schmitt trigger is reset is dependent upon the input signal level and occurs when the input signal drops V2 volts below its delay counterpart Vref.

If, for the small signal case which just causes triggering, V1 = V2 then the circuit is triggered at the end of the pulse rise time and is reset near the end of the pulse fall time, so giving an output pulse of duration substantially equal to T + $tf$. For very large signals the circuit is triggered early in the rise time and reset shortly after the pulse begins to fall (since V1 and V2 are small compared to the pulse amplitude). The output duration for large signals is thus close to T + $tr$. If $tr = tf$ then the circuit theoretically gives a pulse output equal to the conventional half-height pulse width over the whole dynamic range.

The output of the Schmitt trigger 1 can be used in various ways to control timing devices which measure the duration of the output and the timing device 3 shows one convenient form of such a device. The trigger output pulse enables AND gate 4 and clock pulses are thus passed to counter 5 for the duration of the pulse. AND gate 4 is inhibited at the end of the pulse and the count is stopped. The count result, preferably given as a digital readout, gives the duration of the pulse directly in terms of the clock pulse period. The accuracy of the system is dependent upon the clock pulse period, which should obviously be made sufficiently small, compared with the minimum pulse width to be measured, to achieve the required accuracy.

Figure 3A:
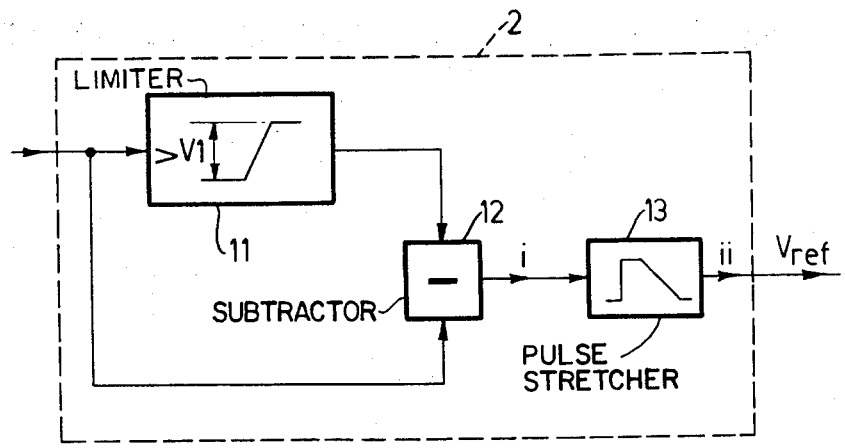
Figure 3B:
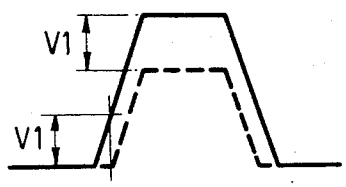

Referring again to the small signal case shown in FIG. 2b, it can readily be seen that if the delay time D produced by the pulse shaper 2 is shorter than the rise time $tr$, the difference voltage V1, necessary to trigger the Schmitt trigger, will not be reached. This Figure shows the limiting case where the pulse signal amplitude only just reaches V1 and where the rise time just equals the delay time D. Thus the limiting case for the minimum amplitude signal is that the delay D is equal to the maximum rise time and, therefore, delay D should preferably be arranged to be equal to or greater than the maximum rise time. Also, of course, the delay time D should be less than the duration of the shortest pulse to be measured since Vref must rise to the maximum amplitude of the signal before the start of the trailing edge. If signals with very slow rise times, such as the hump-shaped signals sometimes encountered with RF signal pulses, are to be measured then the delay D needs to be considerably extended and this tends to reduce the duty cycle of the device. This disadvantage can be overcome, for example, by using alternative forms of pulse shaper 2 as shown in FIGS. 3 and 4. FIGS. 3a and 4a show block schematic diagrams of pulse shaper 2 and FIGS. 3a and 4b show the respective waveforms for slow rise and fall times.

Referring to FIG. 3a, pulse shaper 2 comprises a limiter 11, a subtractor 12, and a pulse stretcher 13. The pulse signal is fed to the input of the limiter 11 and to one input of subtractor 12. The output of limiter 11 is fed to the other (subtracting) input of subtractor 12 the output of which is connected to the input of stretcher 13. The output of stretcher 13 is connected to the reference voltage input Vref of Schmitt trigger 1 as shown in FIG. 1. Limiter 11 clips the pulse signal to a level equal to or slightly greater than the amount V1 and the limited signal so produced is subtracted from the pulse signal in subtactor 12. The signal output of subtractor 12 is shown at (1) in FIG. 3b, from which it can be seen that the pulse signal exceeds Vref by the amount V1 during the rise time and thus ensures triggering of the Schmitt trigger independently of the rise time. On the trailing edge, however, the pulse signal and reference voltage Vref do not cross and, therefore, the pulse signal does not drop below Vref by the amount V2 required to reset the trigger. The reference signal is therefore stretched at its trailing edge by pulse stretcher 13 and the resultant waveform is shown at (ii) in FIG. 3b. Obviously, some delay can also be added to improve the sensitivity to small signals and to assist with the effect of pulse stretching.

Figure 3C:
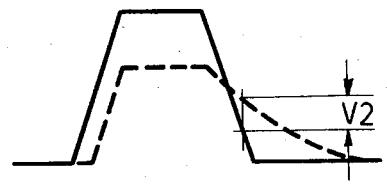
Figure 3C:
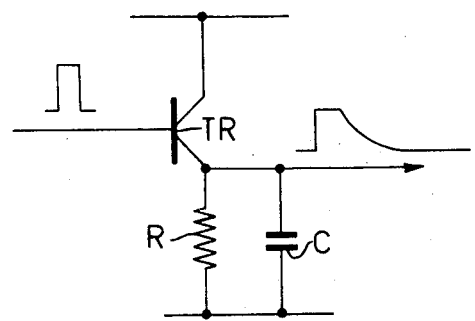
Figure 4A:
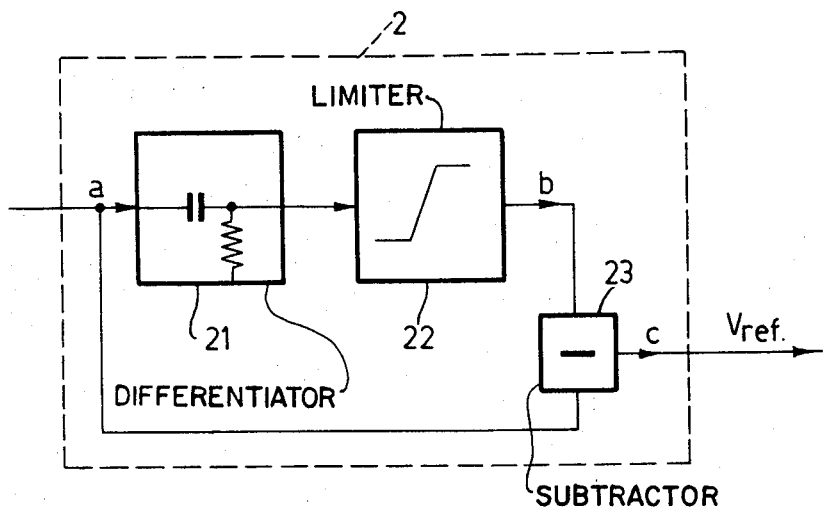
Figure 4B:
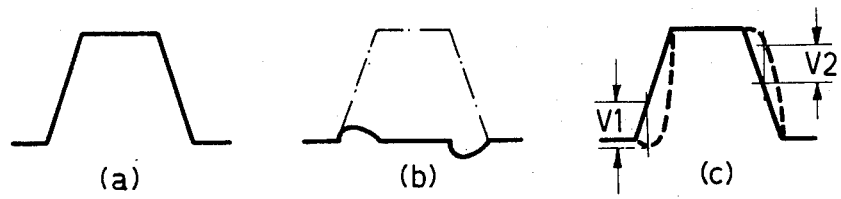

A suitable form of pulse stretching device, which extends the fall time without substantially affecting the rise time, is shown in FIG. 3c and comprises a transistor TR connected in the emitter-follower configuration with a capacitor C forming a parallel RC network with the emitter resistor R. If R is larger (e.g. 1,000 ohms) compared with the "on" resistance (e.g., 10 ohms) of the transistor, the trailing edge is extended more (e.g., about 100 times) than the leading edge, as can be seen from the waveforms.

Although the device is now made virtually independent of rise time, the effect of the pulse stretching still tends to limit the duty cycle of the device. A preferred embodiment which does not affect the duty cycle is shown in FIG. 4a, in which the pulse shaper 2 comprises a differentiator 21 the output of which is fed via a limiter 22 to the subtracting input of a subtractor 23. The signal pulse is fed to the input of differentiator 21 and to subtractor 23 as for the previous embodiment. Differentiator 21 differentiates the leading and trailing edges of the pulse signal and the spikes produced by large input signals are clipped by limiter 22, which has little or no effect on small signals or on slow rise and fall times. The limiter output signal is subtracted from the pulse signal in subtractor 23. The waveforms concerned are shown as a, b and c in FIG. 4b from which it can be seen that, even for the slow rise and fall times shown, the delays required to produce V1 and V2 are achieved without lengthening the duty cycle of the device. It has been found in practice that there is some advantage in adding a small delay D in this embodiment in the same manner as described in relation to the first embodiment.

The accuracy achieved with a device according to the invention is better than $\pm tr/2$ over an input dynamic range of 40dB regardless of wave shape.

What I claim is:

1. A device for measuring the duration of an electrical pulse signal comprising a Schmitt trigger cirucit having a pulse signal input and a reference voltage input, the Schmitt trigger being set to a first state in response to a first predetermined voltage difference between the pulse signal input and the reference signal input, and being reset in response to a second predetermined voltage difference between the reference signal input and the pulse signal input, pulse shaping means for deriving a reference voltage from the pulse signal and for applying the reference voltage to the reference voltage input, and time measuring means controlled by the Schmitt trigger for recording the period during which the trigger is in its first state.

2. A device according to claim 1 wherein the pulse shaping means includes a delay device for delaying the pulse signal to form the reference voltage.

3. A device according to claim 2 wherein the delay device comprises an electrical coil.

4. A device according to claim 2 wherein the delay time of the delay device is equal to or greater than the rise time of the pulse signal and is less than the duration of the pulse signal.

5. A device according to claim 1 wherein the pulse shaping means includes limiting means for limiting the amplitude of the pulse signal by a predetermined amount and further includes a pulse stretcher for extending the fall time of the pulse signal.

6. A device according to claim 5 wherein the predetermined amount is equal to or greater than that amount by which the input signal must exceed the reference voltage to cause the Schmitt trigger to set.

7. A device according to claim 5 wherein the pulse stretcher comprises an emitter-follower connected transistor having its emitter resistor shunted by a capacitor.

8. A device according to claim 5, in which the limiting means comprises an amplitude limiter which limits the amplitude of the pulse signal to the predetermined amount, and a subtractor which subtracts the limited signal from the pulse signal to form the reference voltage.

9. A device according to claim 1 wherein the pulse shaping means includes a differentiator for differentiating the pulse signal and a subtractor for subtracting the differentiated signal from the pulse signal to form the reference voltage.

10. A device according to claim 1 wherein the time measuring means includes a counter for counting the number of clock pulses generated by a clock pulse generator during the set duration of the Schmitt trigger.

11. A device according to claim 10 wherein the time measuring means further includes an AND gate having the outputs of the Schmitt trigger and of the clock pulse generator as inputs, the output of the AND gate being connected to the input of the counter.

12. A device according to claim 10 wherein the counter is provided with an output display device.

13. A device according to claim 10 wherein the counter output is in the form of a digital readout.

* * * * *